United States Patent
Patel et al.

(10) Patent No.: US 12,525,117 B2
(45) Date of Patent: Jan. 13, 2026

(54) CONTEXTUAL ITEM DISCOVERY AND PATTERN INCULCATED REMINDER MECHANISM

(71) Applicant: Kyndryl, Inc., New York, NY (US)

(72) Inventors: Pritesh Patel, Raleigh, NC (US);
Shikhar Kwatra, San Jose, CA (US);
Amitava Kundu, Bangalore (IN);
Sujatha B. Perepa, Durham, NC (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/663,511

(22) Filed: May 14, 2024

(65) Prior Publication Data

US 2024/0304075 A1  Sep. 12, 2024

Related U.S. Application Data

(63) Continuation of application No. 17/704,703, filed on Mar. 25, 2022, now Pat. No. 12,014,617.

(51) Int. Cl.
*G08B 21/24* (2006.01)
*G06N 20/00* (2019.01)

(52) U.S. Cl.
CPC .............. *G08B 21/24* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,274,292 B2 * | 9/2007 | Velhal | G08B 21/0227 340/505 |
| 7,323,988 B2 | 1/2008 | Krstulich | |
| 7,577,522 B2 | 8/2009 | Rosenberg et al. | |
| 7,898,414 B2 * | 3/2011 | Spano | G08B 21/24 340/539.23 |
| 7,994,918 B2 * | 8/2011 | Lai | G08B 13/1427 342/51 |
| 8,717,165 B2 * | 5/2014 | Gernandt | G06K 19/0711 340/539.13 |

(Continued)

FOREIGN PATENT DOCUMENTS

CN  101520938  9/2009

OTHER PUBLICATIONS

Mell et al., "The NIST Definition of Cloud Computing", NIST, Special Publication 800-145, Sep. 2011, 7 pages.

(Continued)

*Primary Examiner* — K. Wong
(74) *Attorney, Agent, or Firm* — Erik Swanson; Andrew M. Calderon; Calderon Safran & Wright P.C.

(57) ABSTRACT

Aspects of the present disclosure relate generally to reminder systems and, more particularly, to a contextual item discovery and pattern inculcated reminder mechanism and methods of use. A computer-implemented method includes: determining, by a computing device, an event in which a user will participate; associating, by the computing device, one or more items with the event; determining a location of the one or more items associated with the event including that the user does not possess any combination of the one or more items; and providing an alert to the user that the any of the one or more items associated with the event is not in the possession of the user.

20 Claims, 7 Drawing Sheets

(56) References Cited

U.S. PATENT DOCUMENTS

| | | | |
|---|---|---|---|
| 8,810,392 B1 | 8/2014 | Teller et al. | |
| 9,489,821 B2 | 11/2016 | King et al. | |
| 11,074,421 B1 | 7/2021 | Le Cam et al. | |
| 11,709,553 B2 * | 7/2023 | Nagar | G06V 10/764 |
| | | | 715/863 |
| 12,014,617 B2 * | 6/2024 | Patel | G06N 20/00 |
| 2007/0037614 A1 | 2/2007 | Rosenberg | |
| 2007/0069897 A1 | 3/2007 | Bauchot et al. | |
| 2018/0233011 A1 | 8/2018 | Conti et al. | |
| 2021/0287519 A1 | 9/2021 | Lin | |

OTHER PUBLICATIONS

Unknown, "New intelligent reminder system with Artificial Intelligence techniques for the elderly", News Medical Life Sciences, Aug. 28, 2009, https://www.news-medical.net/news/20090828/New-intelligent-reminder-system-with-Artificial-Intelligence-techniques-for-the-elderly.aspx, 2 pages.

Inderscience Publishers, "Never forget keys or phone ever again: Intelligent system keeps track of your items", https://phys.org/news/2012-02-keys-intelligent-track-items.html, Feb. 21, 2012, 2 pages.

Unknown, http://www.dontleaveitapp.com/, accessed Mar. 24, 2022, 2 pages.

* cited by examiner

500

| Purse | Car key | Home key | Laptop | Office Badge | Shopping Bag | Weekday | Location | Time | Date |
|---|---|---|---|---|---|---|---|---|---|
| Y | Y | Y | Y | Y | N | Y | Home | 7:30 AM | D1 |
| Y | Y | Y | Y | Y | N | Y | Office | 4:30 PM | D1 |
| Y | Y | Y | N | N | Y | N | Home | 6 PM | D2 |
| Y | Y | Y | Y | Y | N | N | Home | 7:35 AM | D3 |
| Y | Y | Y | Y | Y | N | Y | Office | 4:30 PM | D3 |
| Y | Y | Y | Y | Y | N | Y | Home | 7:35 AM | D4 |
| Y | Y | Y | N | N | N | Y | Home | 7:00 PM | D6 |
| Y | Y | Y | N | N | N | Y | Home | 7:00 PM | D7 |
| … | … | … | … | … | … | … | … | … | … |
| … | … | … | … | … | … | … | … | … | … |
| … | … | … | … | … | … | … | … | … | … |

CONTEXTUAL ITEM DISCOVERY AND PATTERN INCULCATED REMINDER MECHANISM

BACKGROUND

Aspects of the present invention relate generally to reminder systems and, more particularly, to a contextual item discovery and pattern inculcated reminder mechanism and methods of use.

Different items (objects) are needed for different events or tasks. For example, a laptop computer may be needed for work, whereas an instrument may be needed for attending a music recital or lesson. However, it is not uncommon for a user to forget one or more items for a meeting or other task, resulting in inconveniences and/or delays. And, with such busy schedules, it becomes ever more common that the user may forget one or more items needed for any one of the assignments or tasks.

SUMMARY

In a first aspect of the invention, there is a computer-implemented method including: determining, by a computing device, an event in which a user will participate; associating, by the computing device, one or more items with the event; determining a location of the one or more items associated with the event including that the user does not possess any combination of the one or more items; and providing an alert to the user that the any combination of the one or more items associated with the event is not in the possession of the user.

In another aspect of the invention, there is a computer program product including one or more computer readable storage media having program instructions collectively stored on the one or more computer readable storage media. The program instructions are executable to: learn which items are associated with a user event; maintain track of a location of the items associated with user event; determine that one or more items associated with the user event is not in the possession of the user; and provide a reminder to the user that the user is not in possession of the one or more items associated with the user event based on the determination.

In another aspect of the invention, there is system including a processor, a computer readable memory, one or more computer readable storage media, and program instructions collectively stored on the one or more computer readable storage media. The program instructions are executable to: determine, by a computing device, an event in which a user will participate; associate, by the computing device, one or more items with the event; determine that the user does not possess any combination of the one or more items; and provide an alert to the user that the any combination of the one or more items associated with the event is not in the possession of the user.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
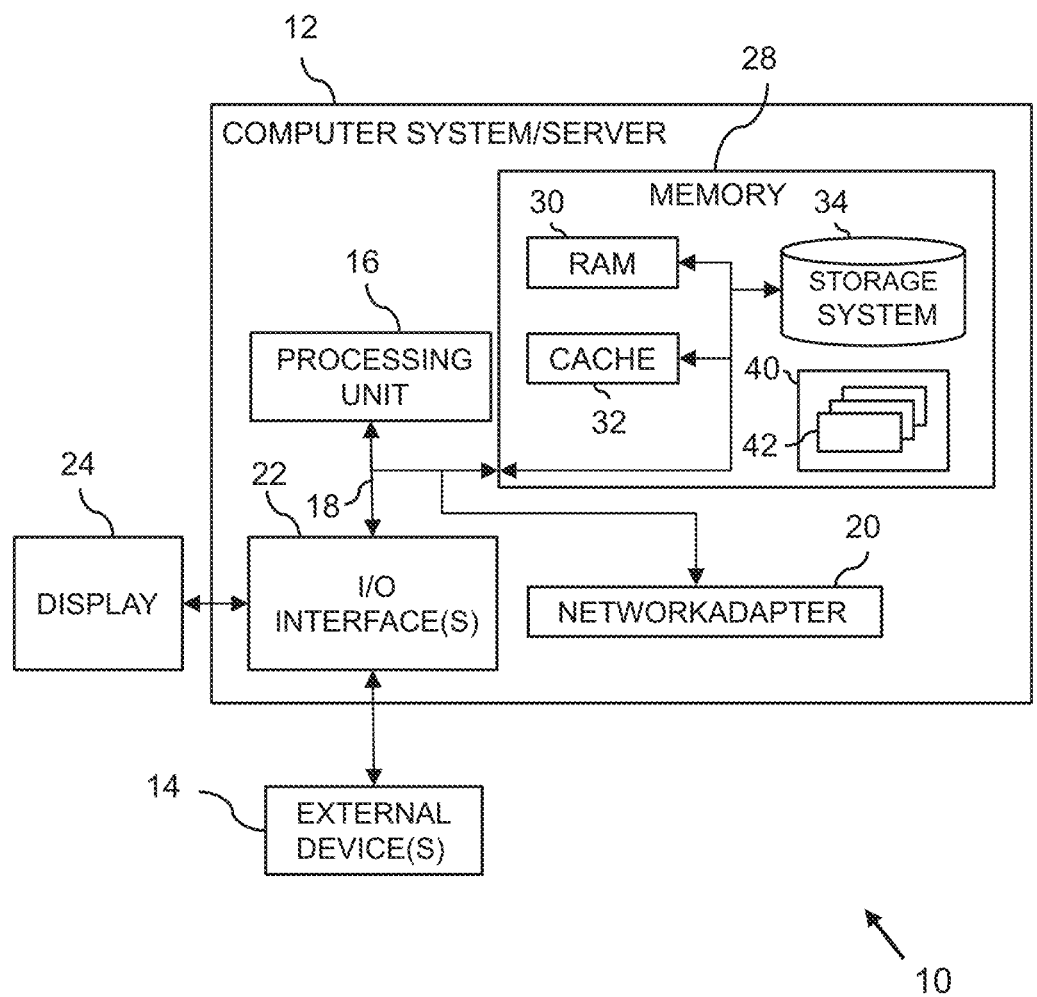
FIG. 1 depicts a cloud computing node according to an embodiment of the present invention.

Aspects of the present invention relate generally to reminder systems and, more particularly, to a contextual item discovery and pattern inculcated reminder mechanism and methods of use. According to aspects of the invention, systems, processes and/or computer program products are configured to identify and dynamically assess what items a user may need for a particular situation and/or task (e.g., event(s)), based on, for example, particular learned factors. These factors may be learned from, for example, any single factor or combination of factors including historical patterns, calendar entries, and/or personal pre-selected preferences or list of items provided by the user, which may be required for certain events. In this manner, implementations of the invention may use machine learning techniques to provide automatic reminders of which items (e.g., objects) may be required for certain events and which items are not currently in the possession of the user.

In more specific embodiments, the systems, processes and/or computer program products (referred to also as "contextual item discovery and pattern inculcated reminder mechanism") identifies and tracks items that a user habitually needs during certain events, i.e., in certain situations or to perform certain tasks, and alerts the user when such items are not in their possession prior to leaving or conducting such events. The contextual item discovery and pattern inculcated reminder mechanism uses an intelligent approach of automatic creation and activation of different lists of items by observing usage pattern of different RFID enabled items or through other smart systems, e.g., smart cameras with object recognition as is known to those of ordinary skill in the art. In further embodiments, items may be tracked by a Wi-Fi enabled connection or Bluetooth enable connection using triangulation methods. In this way, the contextual item discovery and pattern inculcated reminder mechanism may be a smart learning system which works unobtrusively, and which is capable of associating objects with events by various dynamic criteria without the need to establish prior relationships or the need of manual effort.

Accordingly, the contextual item discovery and pattern inculcated reminder mechanism described herein provides a technical solution to a problem by automatically recognizing which items are needed for certain events and providing reminders to a user when such items are not in their possession, prior to leaving for the respective situation or performing such task. This may be provided by machine learning techniques in which the contextual item discovery and pattern inculcated reminder mechanism has situational awareness of which items may be needed for a particular event, the location of such items, and recognizing that the user may not have such items as determined by an item recognition system. Generally, this technical solution can be accomplished through the use of, amongst other features as described herein, (i) an internet of things (IoT) driven smart system to learn user habits of item(s) usage based on item association, location, duration, time, calendar entry and other factors as described herein, (ii) an automatic situation and task aware mechanism for contextual discovery and recommendation of must have and should have objects or factors required by the user, (iii) a prediction mechanism on what a user might likely forget and its location, and (iv) an alert system to provide a reminder to the user that certain items may be needed which the user does not currently have in their possession. The machine learning may use historical patterns of what item(s) the user has previously forgotten prior to being in a certain event, e.g., performing a certain task. In embodiments, the contextual item discovery and pattern inculcated reminder mechanism may also learn and recommend additional items based on objects and factors related to the criticality of the event.

It should be understood that, to the extent implementations of the invention may collect, store, or employ personal information provided by, or obtained from, individuals (for example, calendar entries, historical patterns, lists of items, etc.) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
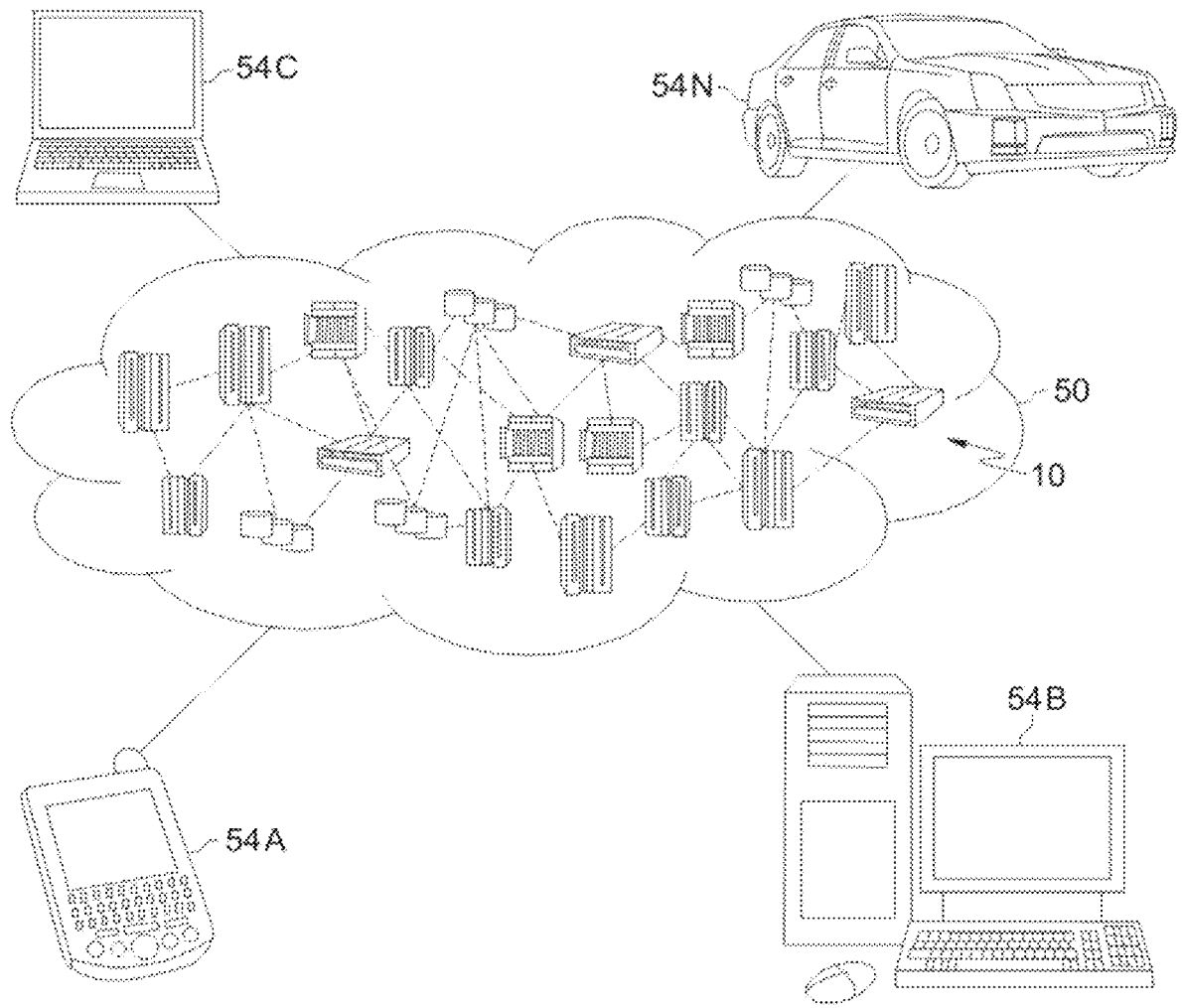
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
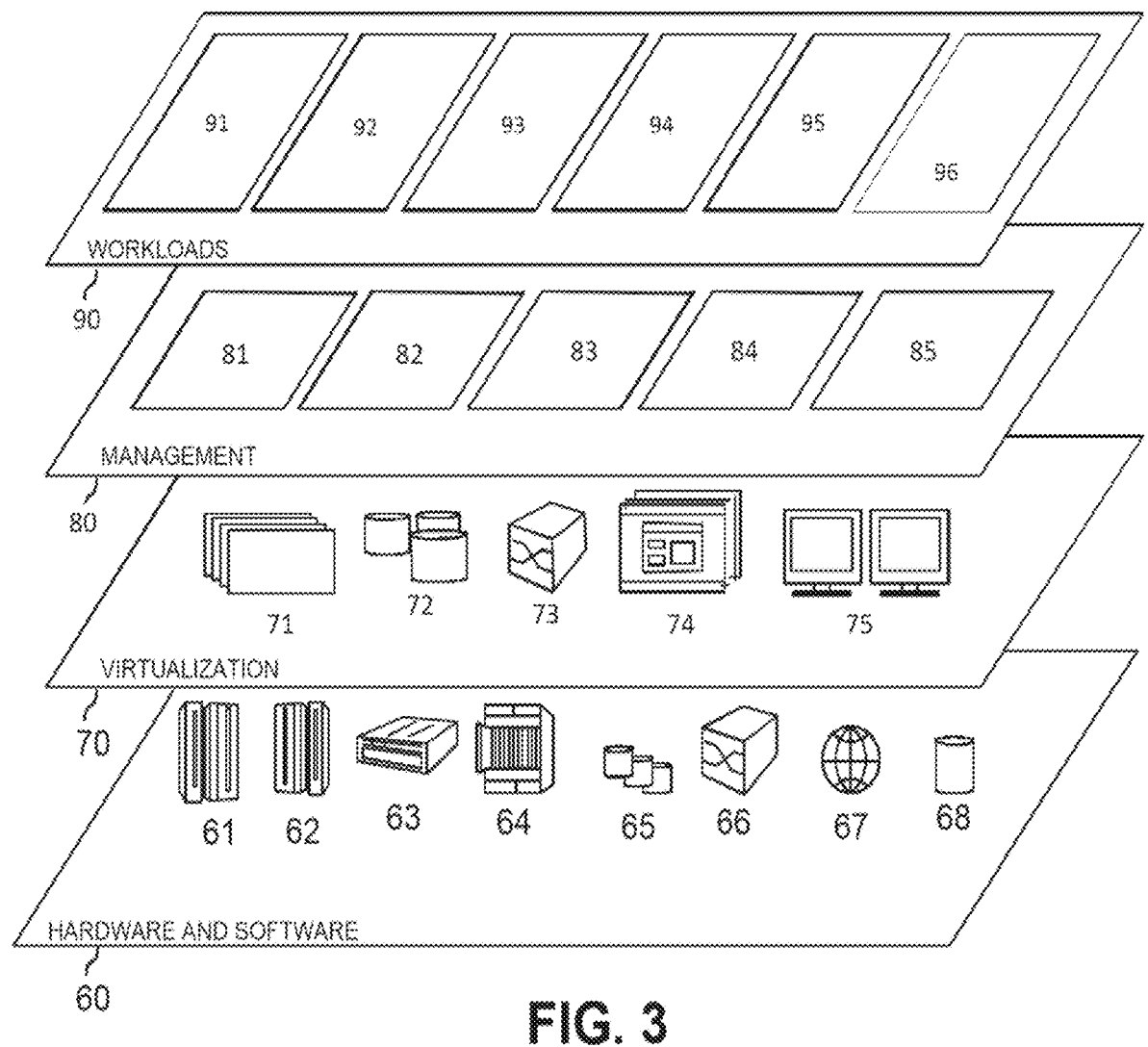
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual item discovery and pattern inculcated reminder module 96.

Implementations of the invention may include a computer system/server 12 of FIG. 1 in which one or more of the program modules 42 are configured to perform (or cause the computer system/server 12 to perform) one or more functions of the contextual item discovery and pattern inculcated reminder module 96 of FIG. 3. For example, the one or more of the program modules 42 may be configured to, amongst other things:
(i) identify and dynamically assess what items a user may need for a particular event based on, for example, particular learned factors;
(ii) identify and track items (e.g., generally known as objects) that a user habitually needs during certain situations or to perform certain tasks (e.g., events);
(iii) provide alerts to the user when such items are not in the possession of the user prior to such events;
(iv) automatically create and/or activate different list of items by observing usage patterns of different RFID enabled items or through other smart systems, e.g., smart cameras with object recognition;
(v) enable machine learning (e.g., smart learning system) to associate items with events by various dynamic criteria without the need to establish prior relationships or the need of manual effort;
(iv) automatically recognize which items are needed for certain events;
(v) enable an internet of things (IoT) driven smart system to learn user habits of item(s) usage based on item association, location, duration, time, calendar entry and other factors as described herein; and
(vi) provide or enable a prediction system on what users might likely forget and its location.

Figure 4:
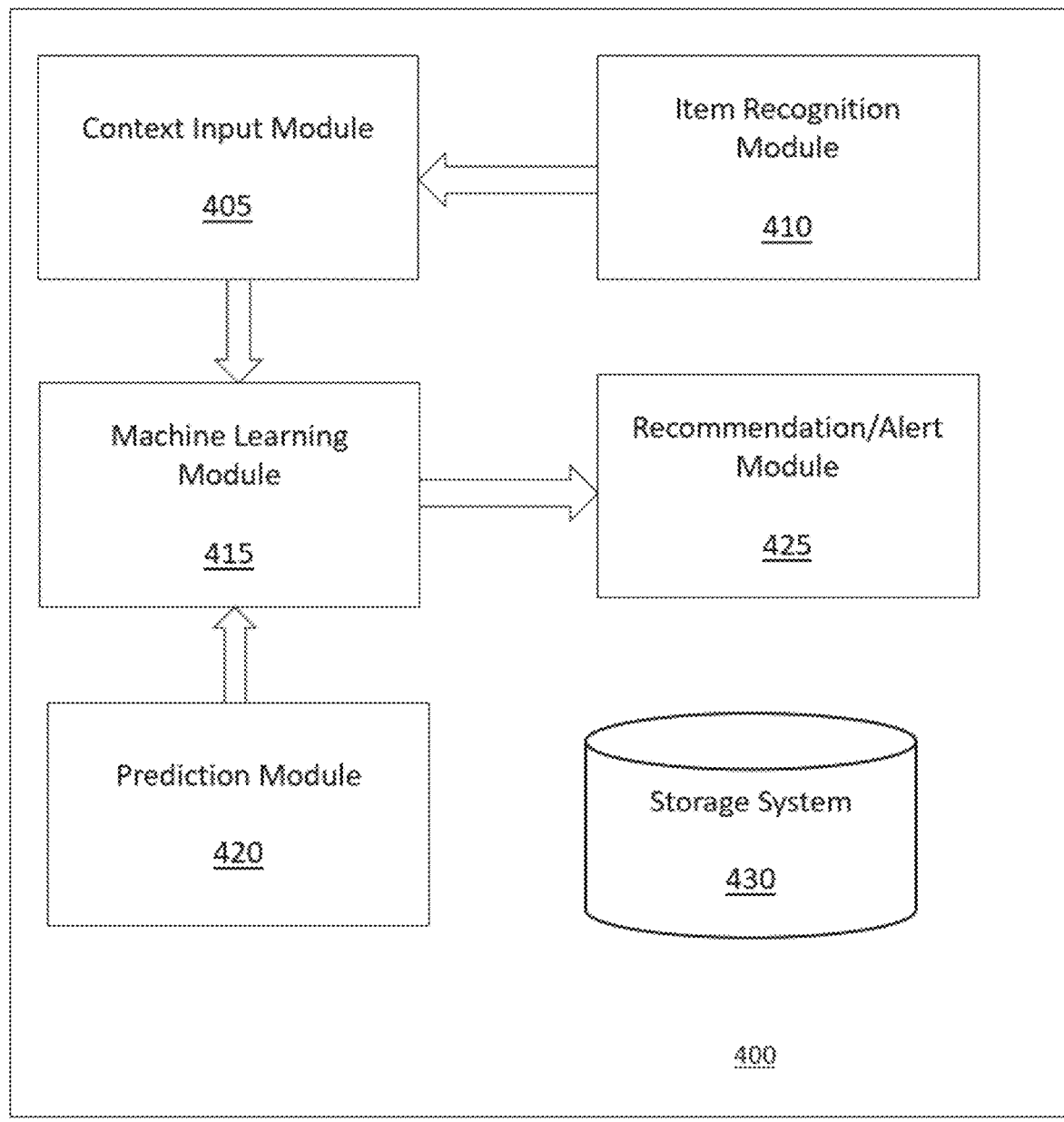
FIG. 4 shows a block diagram of an exemplary environment in accordance with aspects of the invention.

FIG. 4 shows a block diagram of an exemplary environment in accordance with aspects of the invention. In embodiments, the environment 400 includes a context input module 405, an item recognition module 410, a machine learning module 415, a prediction module 420, a recommendation/alert module 425 and a storage system 430. In embodiments, the modules described herein may be implemented in the computer system/server 12 of FIG. 1 or the illustrative cloud computing environment 50 of FIG. 2. In addition, the modules described herein may be implemented in a mobile device or other personal digital assistant or IoT device, for example, while accessing the computer system/server 12 of FIG. 1 or the illustrative cloud computing environment 50 of FIG. 2. For example, a mobile device may act as an RFID reader or camera, and may include one or more processors that provide the functionality as described herein, e.g., track items and provide alerts/reminders to the user for certain items that are needed for certain events. Also, the storage system 430 may be the storage system 35 shown in FIG. 1, for example. In embodiments, the storage system 430 may be a third party service provider which services one or more data storage systems, e.g., databases storing any type of data from the servers.

Referring still to FIG. 4, the context input module 405 may include user defined factors, smart system recommended factors and events that are associated with certain items. In embodiments, the context input module 405 may capture user preferences and habitual usage based items and/or other factors as fed into the context input module 405 by the user or as is learned by the system. These factors may include different events to be performed, which are associated with a particular item, at a particular time of day and particular day of the week, etc., needed for the event. This information may be obtained from:
(i) personal pre-selected preferences or lists of items provided by the user which associates items required for certain situations and tasks;
(ii) historical usage patterns of items associated with certain situations and tasks;
(iii) calendar entries which indicate events that need to be performed (in combination, for example, with historical usage patterns or pre-selected preferences or lists or a prediction of which item may be needed based on other similar events);
(iii) location information of the user;
(iv) location of the items as provided by the item recognition module 410; and/or
(v) smart system recommended factors and situations and/or tasks, e.g., bring a bat when playing baseball.

In embodiments, the items can be recognized by the item recognition module 410. For example, the item recognition module 410 may be a RFID reader or a smart camera which includes object recognition software known in the art. In embodiments, the item recognition module 410 may keep track of all RFID enabled items at certain times and locations. The item recognition module 410 may also or alternatively be a smart camera with item recognition capabilities, which keeps track of items and their locations at certain times, etc. Furthermore, the item recognition module 410 may monitor the proximity of items and determine which items are within range, which are not within range, and which items are going in and out of the range. In this way, the systems provided herein will have situation awareness of the location of items, whether they be currently with the user or at other locations, etc.

The location of the items and the context of their usage and/or duration of the usage may be used as training data for the system to learn certain associations between items and events. This situational awareness may also be used to alert the user that they are not in possession of a needed item. For example, based on the information provided by the item recognition module 410, the machine learning module 415 may determine patterns of usage of the items, based on time of day, location of the items, usage of the items and whether such items are associated with a particular event, such as those provided in calendar entries, user provided lists, historical patterns or a prediction analysis. The information from the lists, calendar entries or historical patterns may be useful for the prediction module 420 and/or machine learning module 415 to determine which items may be useful for a particular event or time of day, as examples. And based on the time/day and proximity of items, an alert message may be generated by the recommendation/alert module 425 indicating that a particular item may be needed for a particular event, and its locations.

More specifically, in embodiments, the machine learning module 415 may use the above information to learn user patterns, i.e., which items should be taken by the user for which situations and/or tasks etc. For example, the machine learning module 415 may use machine learning techniques, e.g., associate rules with items using, e.g., "Apriori", to train itself based on a multitude of observed parameters, and by using rules, etc., it can continually learn from the observations to provide alerts and recommendations via the recommendation/alert module 425 of certain missing items and their location for certain events. In some situations, as the machine learning module 415 is situationally aware, it may also make recommendations of which items may be needed or the possible location of the item using the prediction module 420. For example, by learning historical patterns of previous locations of the items, the system can provide a prediction of where the item is located, when the item cannot be located by RFID or camera. It should be understood by those of skill in the art that the prediction module 420 and the machine learning module 415 may be a single module.

In further embodiments, the machine learning module 415 may create time based and association-based item lists and store them in the device, e.g., storage system 430, i.e., using unsupervised machine learning. The association based lists may also recognize changes in patterns for specific items in terms of dimensions, size, new tag, etc., as representatively shown in FIG. 5. Moreover, if the user dynamically adds new items and/or replaces old items, the machine learning module 415 will automatically add the new items in the list and remove the old items after a predetermined amount of time, e.g., few days or weeks with notification, as also representatively shown in FIG. 6. In this way, the machine learning module 415 continually learns based on different types of information as described herein.

In embodiments, the machine learning module 415 continuously learns from previous situations. For example, should a same calendar entry be provided on a recurring basis, the machine learning module 415 may recognize such recurring pattern and, in combination with other factors, e.g., the user always has their laptop when leaving their house prior to or at a time of the recurring entry, the machine learning module 415 may use this information to learn that the possession of the laptop and a particular time are associated with one another. This being the case, the machine learning module 415 may provide a recommendation to the user to bring their laptop, as it may be recognized by the item recognition module 410 that the user does not have the laptop in their possession prior to the time of the recurring event. Accordingly, the system may learn from user habits based on events, times, item locations, etc.

In another example, the machine learning module 415 may recognize that the user required a particular item #1 (e.g., laptop) when they went to a scheduled meeting at a certain time as noted in a calendar entry. Knowing this information, the machine learning module 415 may associate item #1 with either or both a certain time or a certain location (which the user may be leaving a certain building) and/or similar calendar entries. And, if the user does not have such item in their possession at the certain time, etc., a notification may be provided to the user that the item is at a certain location and that it is required for a certain situation and/or task.

In another example, the machine learning module 415 may use historical patterns to provide notifications, e.g., reminders or alerts, to the user. For example, knowing that the user leaves to work each weekday at 7:00 AM with a laptop and keys, the machine learning module 415 may recognize that the laptop is not in the possession of the user at 7:00 AM (based on information received from the item recognition module 410) and provide an alert to the user, via the recommendation/alert module 425, that the laptop is required and that it is in location #1. In this and other ways, the system dynamically learns, monitors and reminds the user when certain events (e.g., situations/tasks) happen and which items are needed for such events.

Accordingly, in the manner described above, the systems, processes and computer program products described herein learn user habits of item(s) usage based on item association, location, duration, time, calendar entry and other factors. The systems, processes and computer program products can thus be an automatic situation and task aware mechanism for contextual discovery and recommendation of must have and should have objects or factors. The factors and items can be user defined or can be associated by machine learning which, in either case, allows the systems and processes to recommend additional items and factors based on the criticality of the situation. Moreover, based on history of missing items, the systems and processes can thus generate an alert and, in addition, may be able to make predictions based on what a user might likely to forget and its location.

In embodiments, a device, e.g., IoT or mobile device, comprises each of the modules or combination of modules, each of which may comprise one or more program modules such as program modules 42 described with respect to FIG. 1. The device may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the systems, processes and/or computer program products ("contextual item discovery and pattern inculcated reminder mechanism") described herein may learn usage habits by an associated rule learning method and/or process. For example, referring to FIG. 5, a table 500 may be generated based on captured representative set of data. This data is provided only as an illustrative example and should not be considered a limiting feature of the present disclosure. In embodiments, the data set may include different items as tracked by the item recognition module 410.

These items may include, e.g., purse, car key, home key, laptop, office badge, shopping bag, etc. Additional information may include the location of these items, situational usage of these items, time and date of item usage.

Figure 5:
FIG. 5 shows a table representing a cluster of data items in accordance with aspects of the invention.

As shown in FIG. 5, the datasets may be used to learn the potential clustering of data. For example, as the data is captured over time, it can be grouped together by an association rule learning method as representatively shown by the shaded boxes. The systems, processes and/or computer program products can, for example, learn about item association based on calendar entries or user habits as described herein to determine the following examples: (i) type of assignments e.g., sales presentation; (ii) purpose of assignments using, e.g., natural language processing to decipher from meeting description/attachments; (iii) duration of assignments; and (iv) place of assignments i.e., at which location the meeting is happening.

Based on these factors, for example, the systems, processes and/or computer program products can learn the association between location, assignments, items, etc., and remind the person when certain items are forgotten at certain times of day, days of the week, etc. This can be accomplished by applying, for example, certain machine learning techniques, e.g., "Apriori", on the above dataset to create the various clusters and/or associations. Once trained with the association clusters, it is now possible to notify users about one more missing item(s) using the recommendation/alert module 425.

Figure 6:
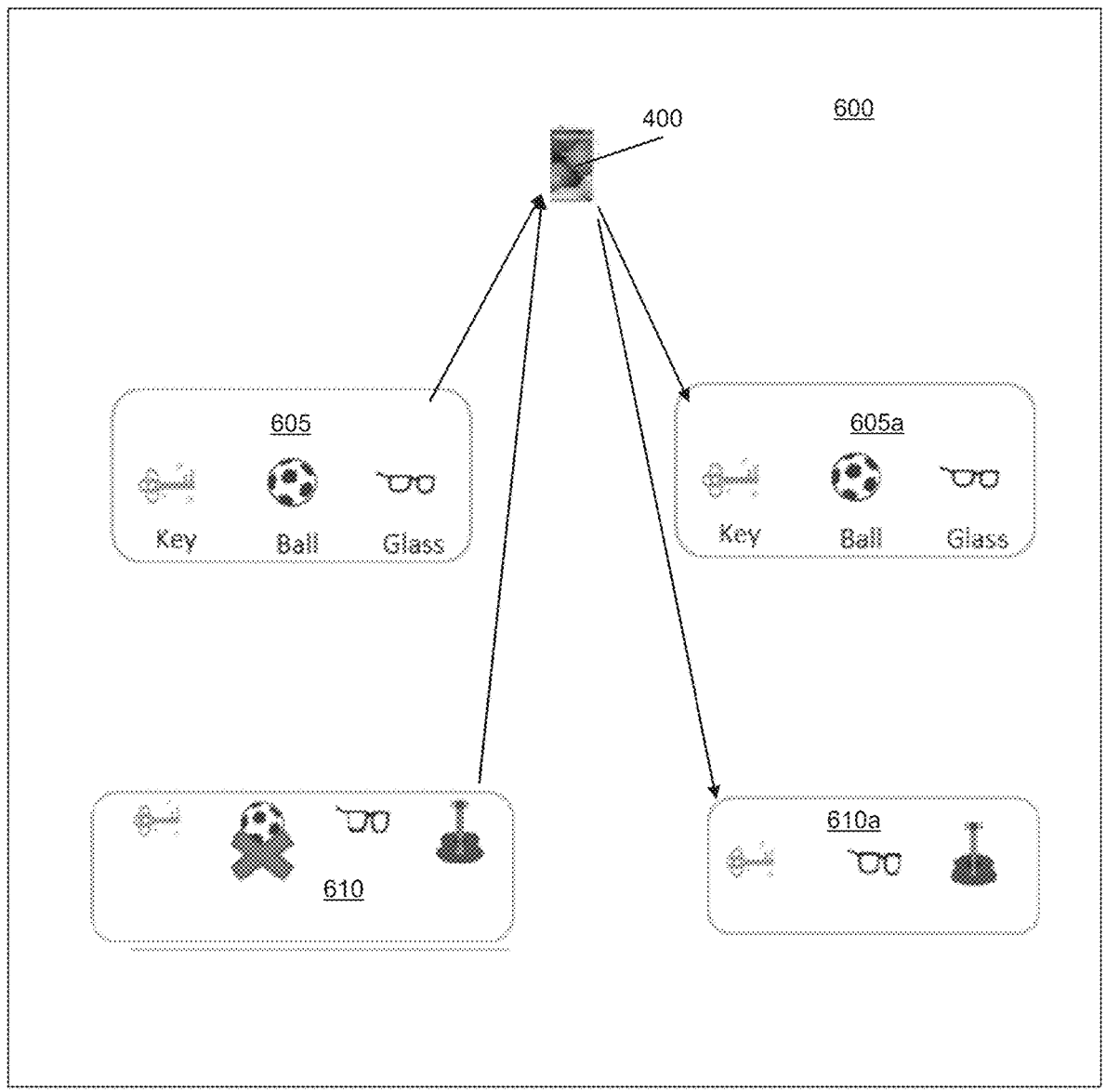
FIG. 6 shows an example use case of the contextual item discovery and pattern inculcated reminder mechanism in accordance with aspects of the invention.

FIG. 6 shows an example use case of the contextual item discovery and pattern inculcated reminder mechanism in accordance with aspects of the invention. More specifically, the example use case shows how the contextual item discovery and pattern inculcated reminder mechanism 600 adjusts itself with changing facts, including adding and deleting of factors. For example, a user who is a habitual soccer player may typically pick up a ball, glasses and keys at a certain time of the day and on certain days. This information may be used in the existing scenarios as represented by boxes 605, 605a. For example, as depicted by environment 400, the item recognition module 410 may determine the location of the items from (e.g., box 605) and the machine learning module 415 may use this information to provide the association between the items and the scheduled event as shown in box 605a.

Now, the user selects a new hobby, e.g., learning to play a guitar, for example. In this scenario the user steps out with a guitar, pair of glasses and the house key (and without the ball) as identified in box 610 and captured by the item recognition module 410. Here, the item recognition module 410 may determine the location of the items (box 610) and the machine learning module 415 may be used to provide the association between the items and the scheduled event (box 610a). In this way, the environment detects the items and creates an association based list of the items. The list may then be updated automatically (box 610a) with the addition and removal of new and old items, respectively. Accordingly, in this scenario, the association learning rule comes to play, in gathering the time and task parameters for both the soccer and the guitar and updates the needed items for reminding the user. Another scenario could be when the user stops playing the guitar, then that scenario is captured. If the guitar play is stopped, the system will keep it in the historic data and prioritize the soccer play scenario.

Additional case examples may include the following non-limiting scenarios.

User #1 goes to work every weekday around 7:30 AM with the following items: car key; home key; purse with ID; laptop bag with laptop and charger; office ID; lunch box; and drink bottle. These same items are also carried back by User #1 every weekday around 4:30 PM. From this information, the systems, processes and computer program products may learn from these habits, providing an association with the items and time, and provide a reminder that (i) the user forgot to take any one of these items when leaving the house in the morning or (ii) did not bring any of these items on return home in the afternoon.

User #2 goes to the gym every weekday around 5:30 AM with the following items: car key; home key; purse with ID; portable music system with headphones. From this information, the systems, processes and computer program products may learn from these habits, providing an association with the items and time, and provide a reminder that the user forgot to take any one of these items when leaving the house in the morning. In a different scenario, the systems, processes and computer program products may recognize or associate that the portable music system with headphones is used at the gym, and recognizing it is gym time, recommend an additional item to bring, e.g., towel. The systems, processes and computer program products may also provide the location of the towel. In future gym scenarios, if the user did, indeed, previously take the towel, the system will provide a reminder to the user to take a towel if not already in the possession of the user.

User #3 is a salesperson who is preparing for a presentation/meeting at a client location. The meeting is scheduled and managed in an organizer calendar. From historical information or patterns of usage and/or times, the systems, processes and computer program products may predict that User #3 requires the following items for such presentation/meeting: laptop, laptop charger and laptop accessories. From this information, the systems, processes and computer program products may determine that one or any combination of the above items are not in the user's possession and provide a reminder that the user forgot to take any one of these items when leaving the house in the morning.

Figure 7:
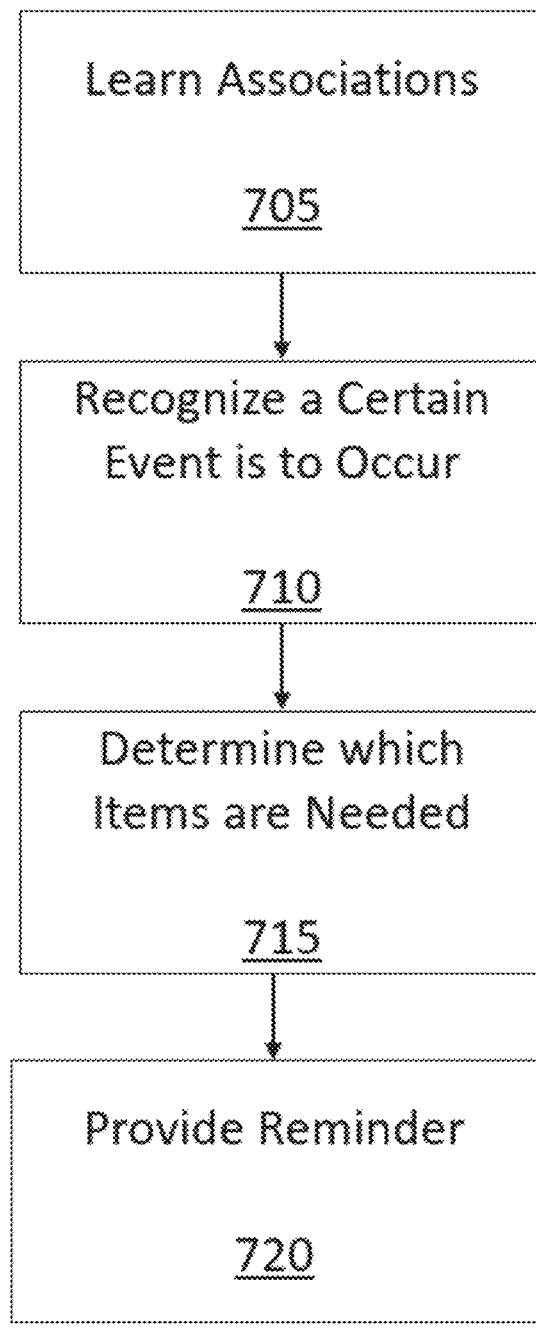
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4. At step 705, the system learns associations between items and/or dates and events as already noted herein. For example, using historical patterns, the system can determine that certain items are associated with certain events that may be conducted at certain times of the day and certain days of the week. At step 710, the system recognizes that a certain event is about to occur. This may be based on historical patterns, predefined lists from the user and/or calendar entries, amongst any combination of other factors described herein. At step 715, based on the certain event recognized to occur, the system will determine which items are needed for the event that is about to occur and, using the item recognition module 410 will determine the location of such items, i.e., whether such items necessary for a particular upcoming event are in the possession of the user. At step 720, for any item that is not in the possession of the user for the upcoming event, the system will provide a notification to the user that the item is needed. In embodiments, the system may also provide the location of such item.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   dynamically identifying, by a computing device, one or more items;
   associating, by the computing device using a machine learning model, the one or more items with an event the user will participate in based on dynamic criteria, the machine learning model trained on a dataset comprising at least one of (i) location of usage of the one or more items, (ii) time of usage of the one or more items, or (iii) context of usage of the one or more items; and
   providing, by the computing device, an alert to at least one user that the one or more items associated with the event is not in possession of the at least one user.

2. The method of claim 1, further comprising predicting an item associated with the event the at least one user is likely to need for the event.

3. The method of claim 2, wherein the predicting comprises prediction analysis of the one or more items, the event, and the dynamic criteria.

4. The method of claim 1, wherein the associating is performed by the machine learning model which learns the one or more items to be associated with the event.

5. The method of claim 1, further comprising: determining a location of the one or more items via an item recognition system comprising a sensor selected from a group consisting of an RFID reader, a Wi-Fi enabled connection, a Bluetooth enabled connection, and a smart camera utilized with object recognition capabilities.

6. The method of claim 1, wherein the dynamic criteria comprises at least one of historical usage patterns, lists of items provided by the at least one user, preferences of the at least one user, location of the at least one user and calendar entries.

7. The method of claim 1, further comprising recommending additional items to be associated with the event and providing a reminder to the at least one user of the additional items that are not in their possession.

8. The method of claim 1, further comprising providing a reminder to the at least one user which of the one or more items are not in the possession of the at least one user.

9. The method of claim 1, further comprising predicting which items are to be associated with the event based on a learned association between the items and the event.

10. The method of claim 1, further comprising adding or removing items from a list of items which are determined to be associated with the event.

11. The method of claim 1, further comprising identifying and tracking the one or more items that the at least one user habitually needs during the participation of the event.

12. The method of claim 1, further comprising automatically creating or activating different list of items by observing usage patterns of different items associated with the event.

13. The method of claim 1, wherein the computing device includes software provided as a service in a cloud environment.

14. A computer program product comprising one or more computer readable storage media having program instructions collectively stored on the one or more computer readable storage media, the program instructions executable to:
   dynamically identify one or more items;
   associating, using a machine learning model, the one or more items with an event the user will participate in based on dynamic criteria, the machine learning model trained on a dataset comprising at least one of (i) location of usage of the one or more items, (ii) time of usage of the one or more items, or (iii) context of usage of the one or more items; and
   providing an alert to at least one user that the one or more items associated with the event is not in possession of the at least one user.

15. The computer program product of claim 14, further comprising adding and removing items from a list of items associated with the event based on recognizing which items are being used by the user.

16. The computer program product of claim 14, further comprising maintaining track of the location of the items via an item recognition system.

17. The computer program product of claim 14, further comprising predicting which items are to be used with which events based on learned habits of the user.

18. A system comprising:
   a processor, a computer readable memory, one or more computer readable storage media, and program instructions collectively stored on the one or more computer readable storage media, the program instructions executable to:
   dynamically identify one or more items;
   associating, using a machine learning model, the one or more items with an event the user will participate in based on dynamic criteria, the machine learning model trained on a dataset comprising at least one of (i) location of usage of the one or more items, (ii) time of usage of the one or more items, or (iii) context of usage of the one or more items; and
   providing an alert to at least one user that the one or more items associated with the event is not in possession of the at least one user.

19. The system of claim 18, wherein the associating the one or more items with the event is provided by creating various clusters of datasets associated with the one or more items.

20. The system of claim 18, further comprising:
maintaining track of a location of the one or more items;
providing a reminder as to which of the one or more items is not in the possession of the user and a current location of the item; and
determining which items are needed for which event and associating the item with the event based on the dynamic criteria.

* * * * *